United States Patent [19]

Griffiths

[11] Patent Number: 5,340,123

[45] Date of Patent: * Aug. 23, 1994

[54] PRESSURE HARDWARE FOR A MODULAR INTER-WALL ELASTOMER SEAL

[75] Inventor: Carl R. Griffiths, Lansing, Mich.

[73] Assignee: Thunderline Corporation, Belleville, Mich.

[*] Notice: The portion of the term of this patent subsequent to May 25, 2010 has been disclaimed.

[21] Appl. No.: 46,580

[22] Filed: Apr. 14, 1993

Related U.S. Application Data

[63] Continuation-in-part of Ser. No. 759,536, Sep. 13, 1991, Pat. No. 5,213,341.

[51] Int. Cl.⁵ .............................................. F16J 15/10
[52] U.S. Cl. .................................... 277/104; 277/192; 277/199; 411/182; 411/432; 411/531
[58] Field of Search ............... 277/102, 104, 108, 192, 277/199; 285/346; 411/34, 36–38, 177, 180, 182, 368–370, 399, 432, 531, 908, 915

[56] References Cited

U.S. PATENT DOCUMENTS

| | | | |
|---|---|---|---|
| 1,449,418 | 3/1923 | Kinne | 411/368 X |
| 1,681,048 | 8/1928 | Purcell | 411/180 |
| 2,258,135 | 10/1941 | Curtis | 411/34 X |
| 2,490,594 | 12/1949 | Madden | 411/180 |
| 2,588,372 | 3/1952 | Erb | 411/432 |
| 2,882,104 | 4/1959 | Guthaus | 277/102 X |
| 3,528,668 | 9/1970 | Barton . | |
| 3,649,034 | 3/1972 | Barton . | |
| 3,703,297 | 11/1972 | Gignac . | |
| 4,623,290 | 11/1986 | Kikuzawa et al. | 411/368 X |
| 4,715,756 | 12/1987 | Danico et al | 411/369 |
| 4,941,069 | 7/1990 | Daneberg et al. | 411/177 X |
| 4,941,358 | 7/1990 | Wing | 411/369 X |
| 4,959,938 | 10/1990 | De Caro | 411/399 X |
| 5,213,341 | 5/1993 | Griffiths . | |

FOREIGN PATENT DOCUMENTS

| | | | |
|---|---|---|---|
| 2113808 | 8/1979 | Fed. Rep. of Germany | 411/180 |
| 29259 | 11/1918 | Norway | 411/177 |

*Primary Examiner*—William A. Cuchlinski, Jr.
*Assistant Examiner*—Scott W. Cummings
*Attorney, Agent, or Firm*—Dorn, McEachran, Jambor & Keating

[57] ABSTRACT

Pressure hardware for a seal block assembly used to form a modular, annular seal around a conduit passing through a wall, the assembly including elastomer seal blocks joined in an annulus around the conduit, the seal blocks having pressure bolt apertures parallel to the conduit; the seal blocks are axially compressed and radially expanded to form the seal. The pressure hardware is in sets each including a bolt, a matching nut, and a first molded resin pressure plate having a recess large enough for freely rotatably seating the bolt head, with peripheral access for a wrench; a washer is rotatably positioned in the bottom of the recess, which is deep enough so that the bolt head does not project substantially. The bolt rod extends through a bolt-receiving aperture in the first pressure plate. A second molded resin pressure plate has a socket complementary to the nut, which seats in the socket non-rotatably relation and a bolt-receiving aperture allow the bolt rod to engage the nut; in one form, the socket has crush ribs to hold the nut firmly in place. In another embodiment, the second molded resin pressure plate has a threaded bolt-receiving aperture in which the bolt rod engages. Also disclosed are resin caps that inhibit corrosion of the metal parts of the assembly.

10 Claims, 5 Drawing Sheets

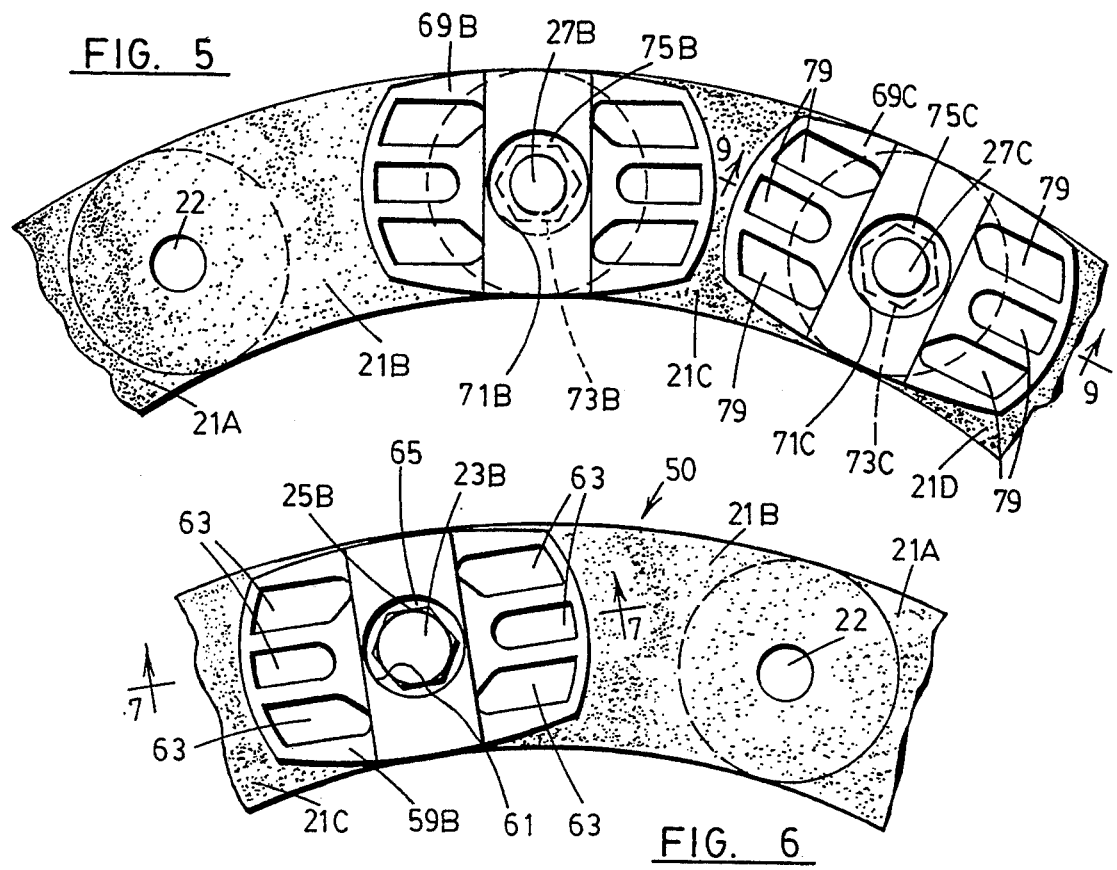
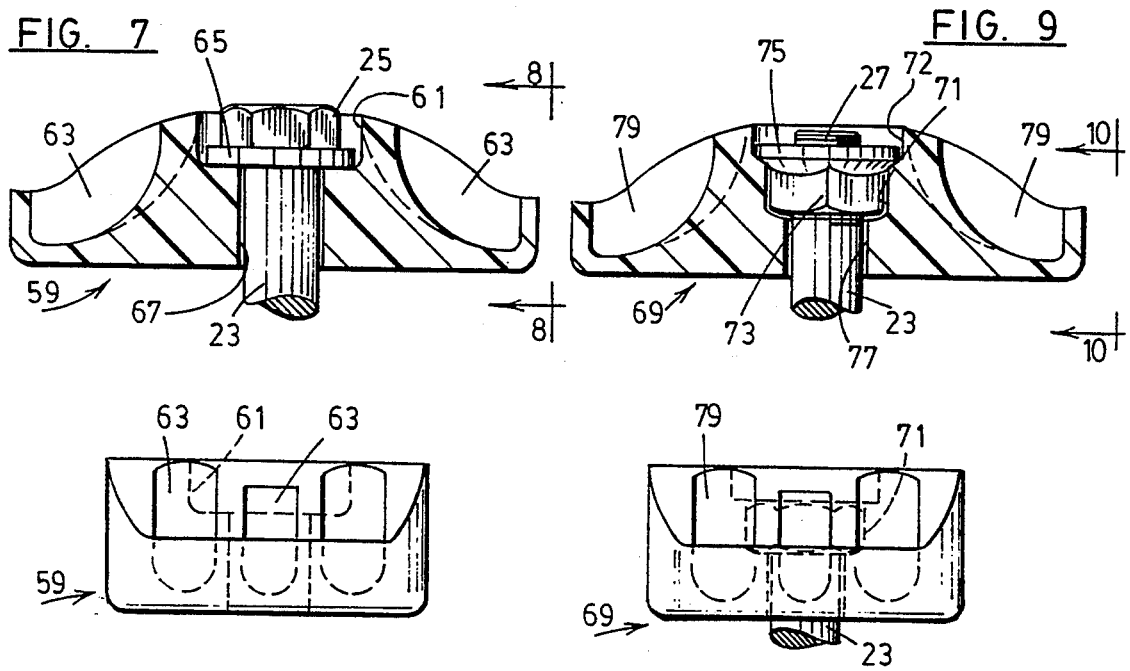

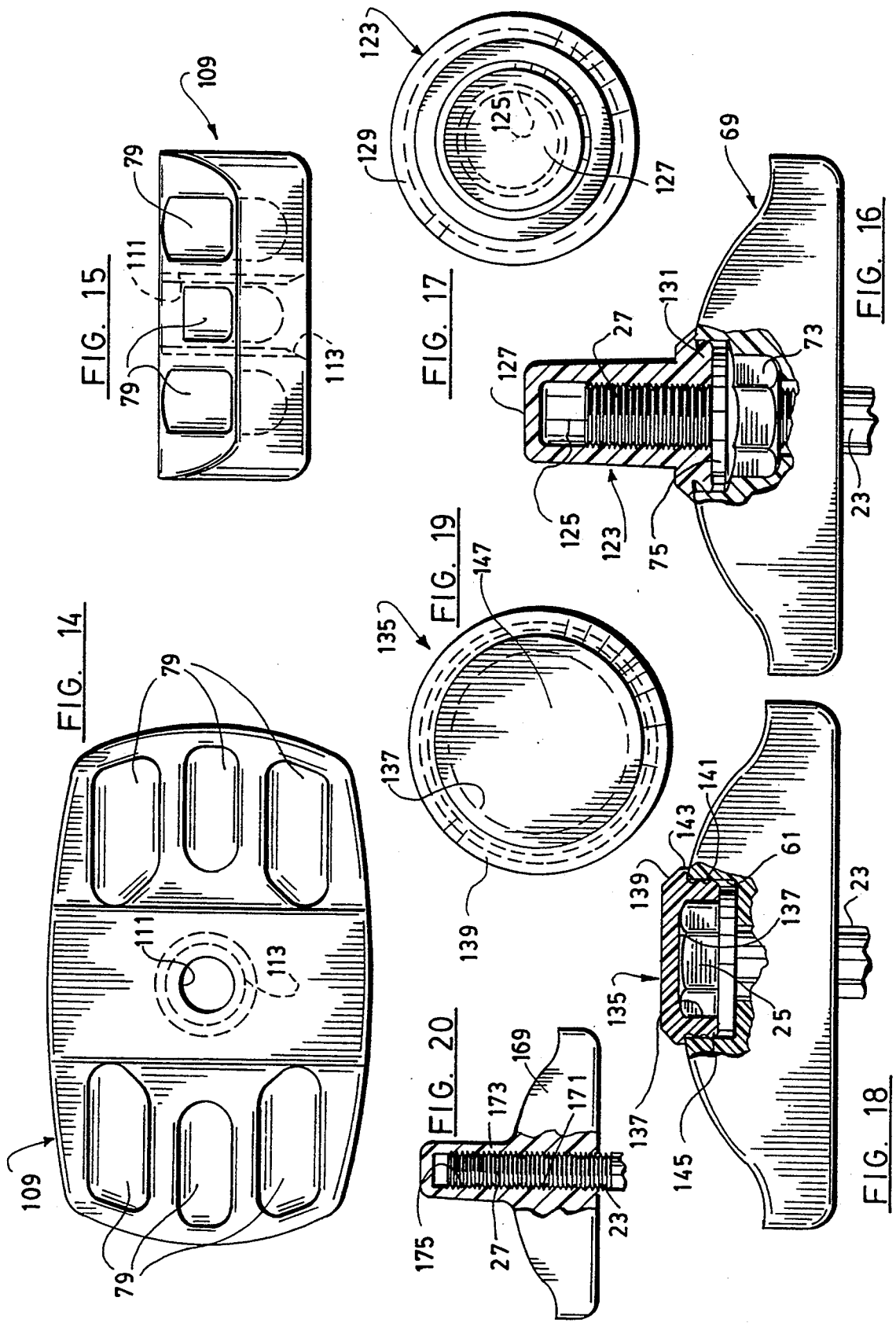

PRESSURE HARDWARE FOR A MODULAR INTER-WALL ELASTOMER SEAL

CROSS-REFERENCE TO RELATED APPLICATIONS

This application is a continuation-in-part of application Ser. No. 07/759,536 filed Sep. 13, 1991 now U.S. Pat. No. 5,213,341 issued May 25, 1993.

BACKGROUND OF THE INVENTION

A modular seal assembly that has become a standard device for positive, hydrostatic sealing of the annular space between a pipe or other conduit and a passage or casing through which the conduit extends, usually traversing a wall, is described in Barton U.S. Pat. No. 3,528,668 issued Sep. 15, 1970. Variations of that modular seal construction are disclosed in Barton U.S. Pat. No. 3,649,034 issued Mar. 14, 1972 and in Gignac U.S. Pat. No. 3,703,297 issued Nov. 21, 1972. These annular seals are each made up of a plurality of individual elastomer seal blocks faced with two sets of pressure plates. Bolts that interconnect the pressure plates may also join the blocks in a ring structure surrounding the conduit where it passes through a wall. The bolts are utilized to pull the pressure plates toward each other, once the annular seal structure is in place, compressing the elastomer seal blocks in a direction parallel to the conduit and expanding the seal blocks radially outwardly in the space between the conduit and the wall passage or other passage. In this way a highly versatile and economical seal structure is formed with a single set of components that may be used for many different conduit sizes. Many years of rugged on-the-job use have demonstrated that this modular, annular conduit-to-wall-opening seal is far superior to most other seal structures.

Despite their proven versatility and value, the modular, annular seals of the aforementioned Barton and Gignac patents, particularly U.S. Pat. No. 3,528,668, have demonstrated some technical difficulties. In large sizes, particularly, the weight of the overall assembly is substantial and may make it difficult for workmen to install, especially due to the use of relatively large and heavy metal components in the pressure hardware that joins and expands/contracts the elastomer seal blocks. The pressure hardware, particularly metal components, has used non-standard members, and costs tend to be higher than desirable. At the same time, the exposed metal, in some environments, is often susceptible to undesirable corrosion, particularly galvanic corrosion. The strength of the seal may be less than desirable in some instances. Metal parts, particularly nuts, are easily lost, again increasing costs. And perhaps the most important problem encountered with these seals pertains to consistency of the required expansion/contraction during installation. It has been difficult if not impossible to specify the tightening of the pressure hardware required to attain the desired positive sealing effect without over-stressing that hardware or some other component of the seal assembly.

SUMMARY OF THE INVENTION

It is a principal object of the present invention, therefor, to provide new and improved pressure hardware for a seal block assembly for forming a modular, annular conduit-to-wall-opening seal from a plurality of elastomer seal blocks, pressure hardware that effectively and economically minimizes or eliminates the technical difficulties of previous known seal assemblies of this general kind.

A more specific object of the invention is to provide new and improved pressure hardware for a seal block assembly utilized to incorporate a plurality of elastomer seal blocks in a modular, annular conduit-to-wall-opening seal, pressure hardware that is simple and economical in construction, with no readily lost parts, yet which permits specification of particular torque loadings on the pressure hardware to assure effective seals without damage to the pressure hardware.

Accordingly, the invention relates to a seal block assembly for forming a modular, annular conduit-to-wall-opening seal of the kind comprising a plurality of elastomer seal blocks joined to each other in an annulus around a conduit, each seal block having at least one pressure bolt aperture therethrough parallel to the conduit axis, the seal blocks being axially compressed and radially expanded to form a seal between the conduit and an external encompassing wall. The assembly includes a plurality of sets of pressure hardware for compressing and expanding the seal blocks, each set of pressure hardware comprising a bolt having a plural-facet head of given size and shape integral with one end of a bolt rod, the bolt rod having a threaded portion extending longitudinally from its other end toward its bolt head end. There is a first molded resin pressure plate having a recess larger than the bolt head so that the bolt head seats in freely rotatable relation in the recess, with peripheral access for a wrench around the bolt head, in each pressure hardware set, and with no metal-to-metal sliding contact when the bolt is tightened; the recess is deep enough so that the bolt head does not project substantially out of the recess. The first pressure plate further has a first bolt receiving aperture therethrough, aligned with the recess, the first bolt-receiving aperture being large enough to admit the bolt rod therethrough but small enough so that the bolt head cannot enter. Each pressure hardware set includes a plural-facet nut of predetermined size and shape having an internal aperture threaded to engage the threaded portion of the bolt rod and a second molded resin pressure plate. Each second pressure plate has an inner plural-facet socket portion with a size and shape complementary to the nut so that the nut seats in non-rotatable relation in the socket and an outer socket portion having a transverse dimension greater than the maximum transverse dimension of the inner socket portion, with a shelf at the outer edge of the inner socket portion. An integral flange on the nut seats on this shelf.

The second pressure plate further has a second bolt-receiving aperture therethrough, smaller than the nut, aligned with the socket to admit the other end of the bolt rod into engagement with the nut.

BRIEF DESCRIPTION OF THE DRAWINGS

FIG. 5 is an elevation view taken approximately along line 5—5 in FIG. 4, with one pressure plate omitted;

FIG. 6 is a fragmentary elevation view taken in the opposite direction from FIG. 5;

FIG. 7 is a detail sectional view taken approximately along line 7—7 in FIG. 6;

FIG. 8 is a detail view taken approximately along line 8—8 in FIG. 7;

FIG. 9 is a detail sectional view taken approximately along line 9—9 in FIG. 5;

FIG. 10 is a detail view taken approximately along line 10—10 in FIG. 9;

FIG. 14 is a plan view of the second pressure plate shown in FIG. 13;

FIG. 15 is an end elevation view of the pressure plate shown in FIGS. 13 and 14;

FIG. 16 is a partially cutaway elevation view of a bolt thread end cap in a second pressure plate;

FIG. 17 is a plan view of the bolt thread cap shown in FIG. 16;

FIG. 18 is a partially cutaway elevation view of a bolt head cap in a first pressure plate; and FIG. 19 is a plan view of the bolt head cap shown in FIG. 18.

DESCRIPTION OF THE PREFERRED EMBODIMENT

Figure 1:
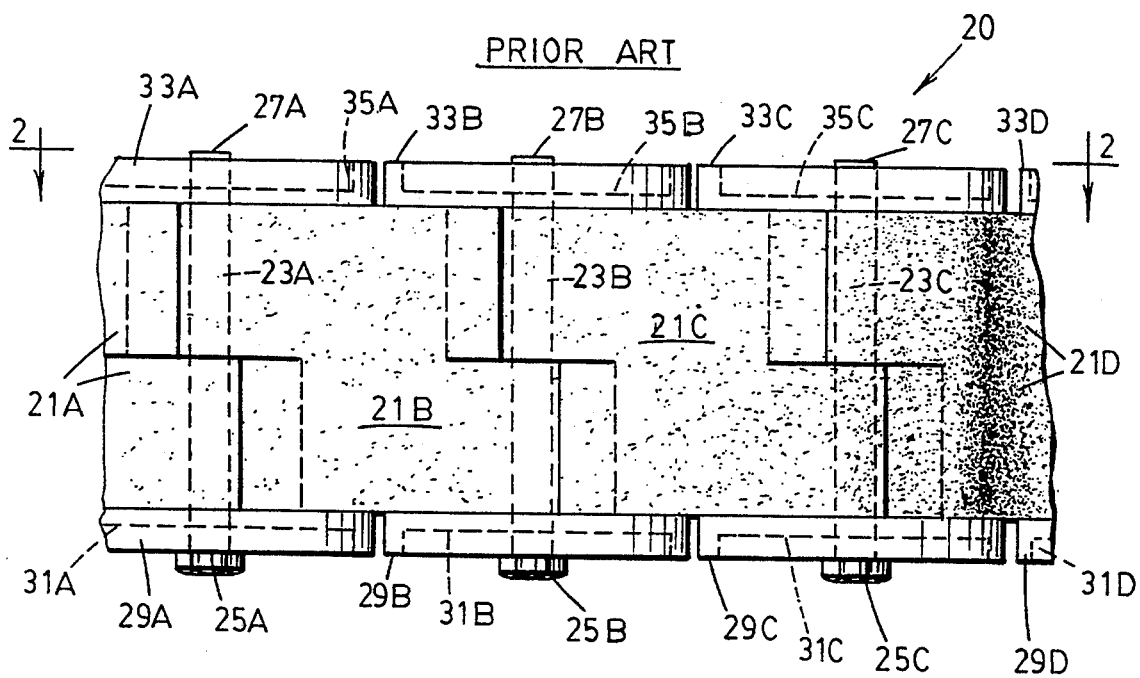
FIG. 1 is a plan view of a part of a prior art modular seal block assembly.
Figure 2:
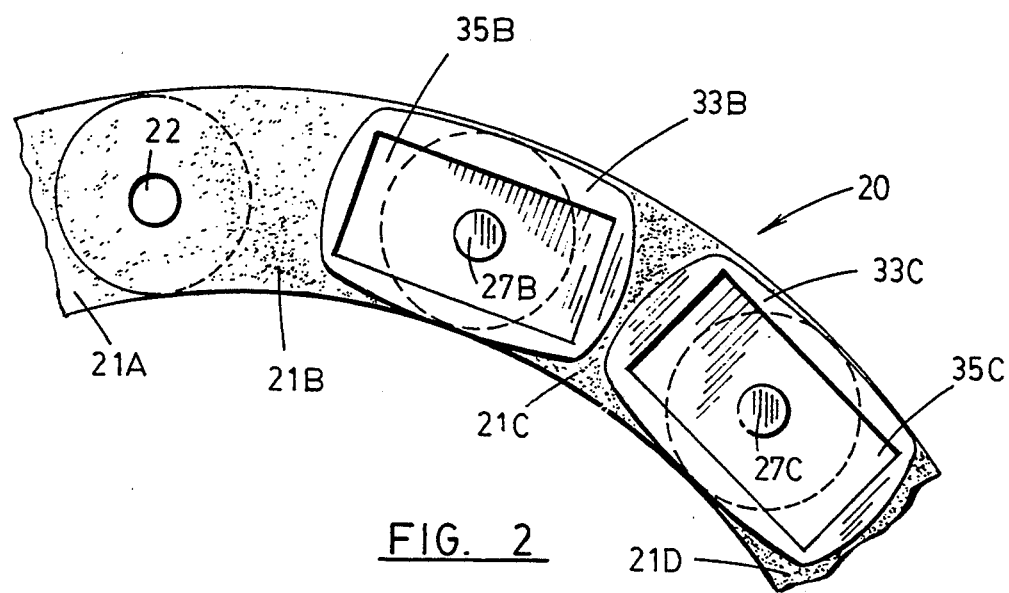
FIG. 2 is an elevation view of the prior art assembly, taken approximately along line 2—2 in FIG. 1, with one pressure plate omitted.
Figure 3:
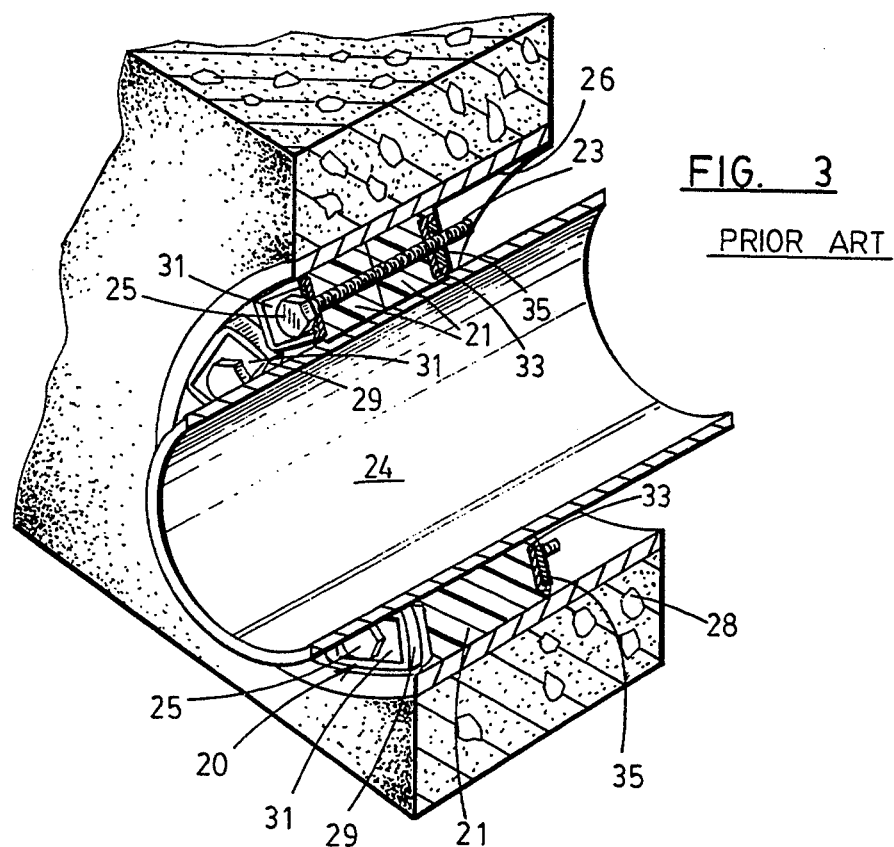
FIG. 3 is a cut-away perspective view employed to explain use of the prior art seal block assembly of FIGS. 1 and 2.

FIGS. 1-3 illustrate a prior seal block assembly 20 for forming a modular, annular conduit-to-wall-opening seal, utilizing a construction that has been known in the art for a number of years and that has been available from Thunderline Corporation of Belleville, Mich., USA, under the trademark LINK-SEAL. The seal block assembly 20 is formed of a plurality of elastomer seal blocks 21, designated 21A-21D in FIGS. 1 and 2. These seal blocks are joined to each other in an annulus around a conduit 24 (FIG. 3). Only a portion of assembly 20 is shown in each of FIGS. 1 and 2. Each block has two apertures to receive a pressure bolt; one such aperture 22 is shown in the drawings, FIG. 2. A plurality of pressure bolts extend through these apertures to join the seal blocks in the assembly that is to form the seal, as shown by pressure bolts 23A, 23B, and 23C in FIGS. 1 and 2.

Each of the pressure bolts 23 has a conventional bolt head 25, as indicated by the bolt heads 25A-25C in FIG. 1. The other end of each bolt rod, the distal end of the bolt in relation to its head, includes a relatively long threaded portion. The distal tip ends 27A-27C of the bolts can be seen in FIG. 1; the ends 27B and 27C of two of the bolts appear in FIG. 2.

The head 25 of each bolt 23 engages a composite metal and plastic pressure plate. Referring to FIG. 1, it is seen that each bolt head 25A-25C engages a metal pressure plate 31A-31C positioned within a recess in a plastic pressure plate 29A-29C. The orientation of these members is also shown at the left-hand side of assembly 20 in FIG. 3. The bolt head is entirely external to the pressure plate structure in each instance.

At the distal end of each bolt there is a plastic pressure plate 33 having a recess or socket in which a large nut 35 is positioned; see plates 33A-33C and nuts 35A-35C, FIG. 1. This portion of the assembly is best shown in FIG. 2; as seen therein, each of the nuts 35B and 35C is of rectangular configuration and fits in a socket or recess in its plastic pressure plate, the plates 33B and 33C. In practice, the configurations of the plastic plates on the opposite sides of the assembly may be the same.

To complete a seal, as between conduit 24 and a sleeve 26 through a concrete wall 28 (FIG. 3), the elastomer seal blocks 21 are first connected by the pressure hardware comprising the bolts 23, the pressure plates 29, 31 and 33, and the nuts 35, to form a belt. The length of the belt depends upon the number of seal blocks used in it, which in turn depends upon the circumference of conduit 24 (FIG. 3). The belt is disposed around the conduit and the last loose ends of the belt are joined by a final set of the pressure hardware to complete the annulus around the conduit. The seal assembly is then pushed along the conduit, lengthwise, into position in the wall sleeve 26, as shown in FIG. 3.

At this point, the pressure bolts 23 are tightened and the pressure plates compress the elastomer blocks 21 in a direction parallel to conduit 24. This expands the elastomer blocks in a direction radial to the conduit and forms a continuous, air-tight, water-tight seal between the pipe or other conduit 24 and the sleeve 26 in the wall.

FIGS. 4-10 illustrate a seal block assembly 50 that incorporates one embodiment of the improved pressure hardware of the present invention. Seal block assembly 50, FIGS. 4-6, may include the same elastomer block members as in the previously described prior art seal assembly. Thus, the elastomer blocks 21A-21D are shown joined together by bolts 23 that extend through the pressure bolt apertures in the blocks, such as aperture 22, FIGS. 5 and 6. The bolt heads 25A-25D are unchanged from the previous embodiment; indeed, the bolts 23 are interchangeable between the old and new assemblies. It is the remainder of the pressure hardware that is substantially modified in FIGS. 4-10 and that affords the improvements of the present invention.

Figure 4:
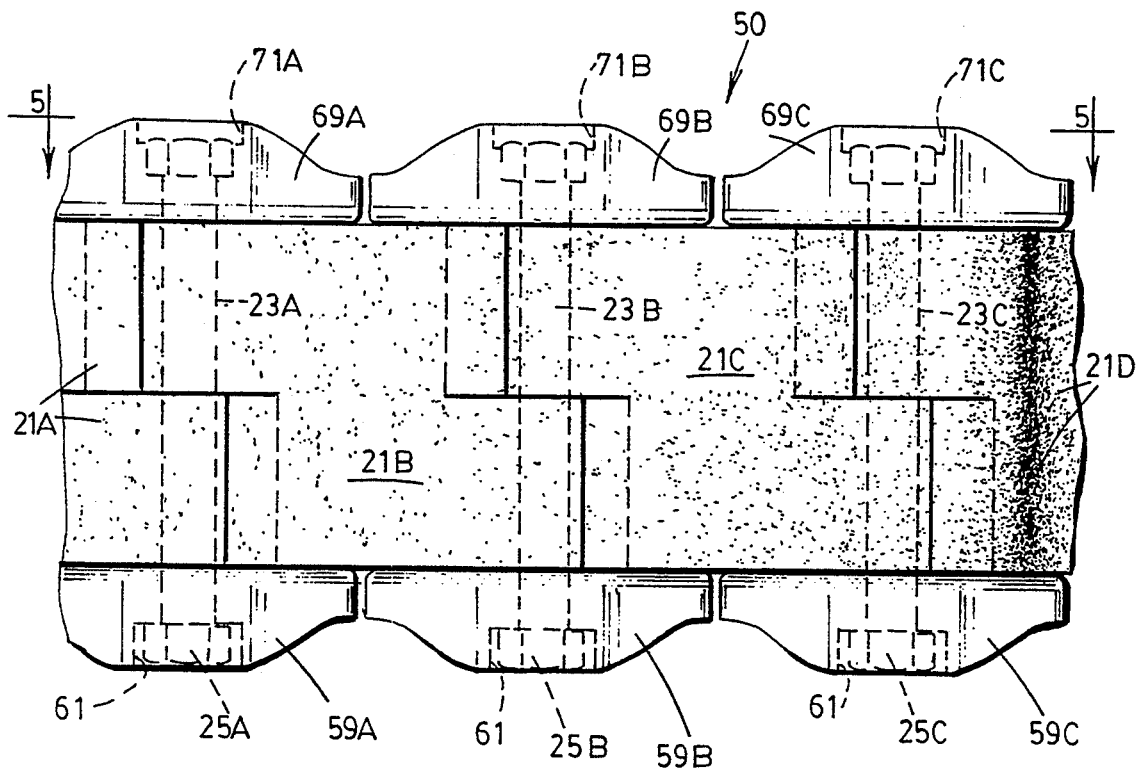
FIG. 4 is a plan view, like FIG. 1 of a part of a modular seal block assembly that includes the pressure hardware of the invention.

Each set of pressure hardware utilized in assembly 50 includes the aforementioned conventional bolt and a first molded resin pressure plate 59; three of these molded resin pressure plates 59A-59C are shown in FIG. 4, with one plate 59B appearing in FIG. 6. FIGS. 7 and 8 provide further details of construction of the pressure plates. Thus, each pressure plate 59 has a central recess 61 that is larger than the bolt head 25 seated in the recess (FIGS. 4, 6 and 7) so that the bolt head is in freely rotatable relation in the recess. Lateral depressions 63 on the opposed outer sides of each resin pressure plate 59 may be provided, primarily to reduce the cost of the pressure plate. As is apparent in both FIGS. 6 and 7, recess 61 is large enough to afford peripheral access to bolt head 25, so that a wrench can be fitted around the bolt head 25 seated in the recess.

A metal washer 65 is positioned in the bottom of recess 61, between bolt head 25 and the base of the recess. Recess 61 is deep enough so that bolt head 25 does not project substantially out of the recess, though the outer surface of the bolt head may be slightly above the outer surface of plastic pressure plate 59; see FIG. 7. The projection of bolt head 25 out of pressure plate 59 is preferably less than 0.125 inch (0.3 cm). Plastic pressure plate 59 has a bolt-receiving aperture 67 through the bottom of the pressure plate, aligned with recess 61;

aperture 67 is large enough to admit the rod portion of a bolt 23 but small enough so that neither washer 65 nor bolt head 25 can enter.

For each bolt 23 in assembly 50 there is also a second molded resin pressure plate 69. The construction of the pressure plates 69 is best shown in FIGS. 4, 5, 9 and 10. Each of the second pressure plates 69 has a plural-facet socket 71 and an adjacent recess 72 opening outwardly from the socket 71. The size and shape of socket 71 is complementary to a plural-facet nut 73 that is included in each set of the improved pressure hardware. Each nut 73 could be an ordinary, conventional hexagonal machine nut, but the preferred construction for large-size seals includes a flange 75 that seats in the upper rim portion of each socket 71 to afford a larger surface area for absorption of forces applied to the second pressure plate 69 by the nut 73. The recess 72 is cylindrical in shape and has a diameter large enough to afford peripheral access for insertion of the nut 73 into the socket 71, with the flange 75 in the recess 72.

Of course, the illustrated construction locks each nut 73 into its socket 71 so that the nut cannot rotate in the socket. Each second pressure plate 69 has a central aperture 77 through which bolt 23 extends into threaded engagement in nut 73 (FIG. 9), and preferably has depressions 79 to reduce weight and cost.

Figure 11:
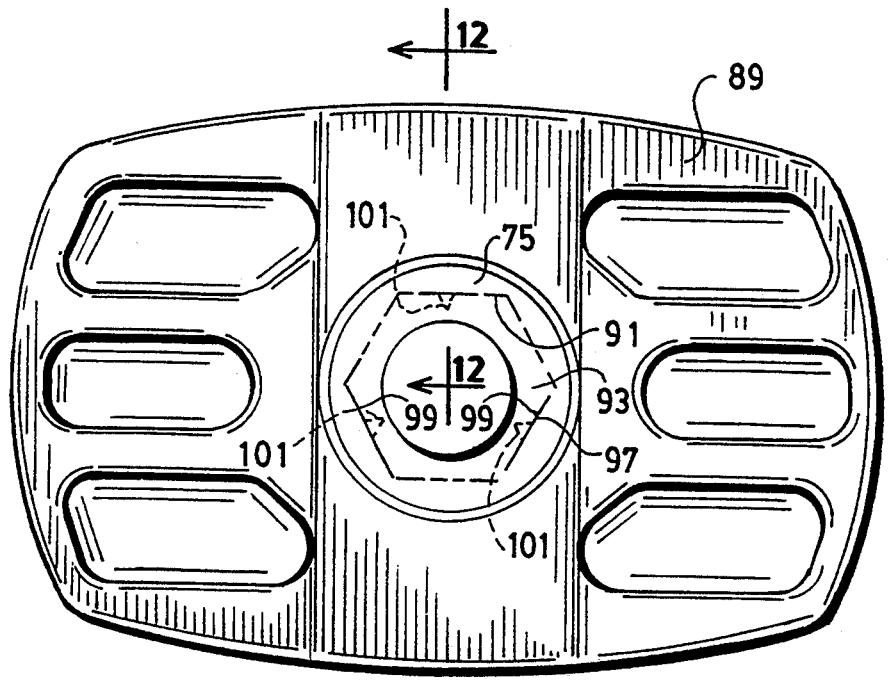
FIG. 11 is a plan view of another embodiment of the first pressure plate.
Figure 12:
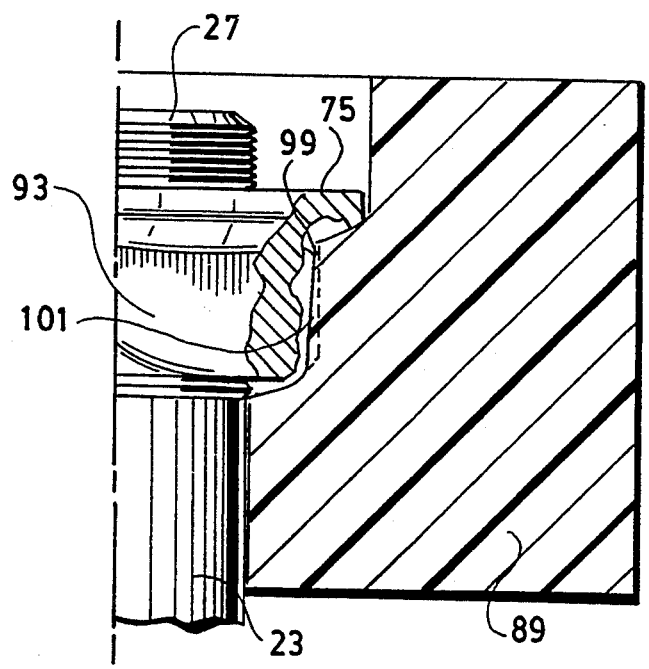
FIG. 12 is a detail sectional elevation view taken approximately along line 12—12 in FIG. 11.

FIGS. 11 and 12 illustrate another embodiment of a second molded resin pressure plate, designated as plate 89, providing an improved retention capacity for inhibiting rotation of the nut in the socket of the pressure plate. This construction further permits the pressure plate 89 to firmly retain a nut 93 in place in the pressure plate socket. Thus, as shown in FIGS. 11 and 12, pressure plate 89 includes a plural-facet socket 91 in which plural-facet nut 93 has been inserted in the same way that the nut 73 is inserted into socket 71 (FIG. 9).

The molded resin pressure plate 89, including its socket 91, is similar in most respects to the pressure plate 69 of FIG. 9. However, socket 91, shown as having a six facet opening for receiving the corresponding hexagonal nut 93, includes three facets 97 each having an axially extending inwardly protruding crush rib 101 that projects partially into socket 91. Ribs 101 are integrally molded with the pressure plate 89 and each alternating facet 97 of socket 91 includes one crush rib 101. Crush ribs 101 are preferably V-shaped, though other shapes may be used. The number of crush ribs is not critical, though three such ribs are preferred. Each of the ribs 101 is engaged and crushed or distorted by hex nut 93 when the nut, having been inserted into socket 91, is drawn downwardly into socket 91.

As shown in FIG. 12, ribs 101 are preferably tapered outwardly with increasing depth of socket 91, so that the rib protrusion into socket 91 increases with socket depth. Thus, as the hexagonal nut 93 is drawn into its socket 91 as by the action of a bolt 23 being tightened, the tapered edges of the crush ribs 101 engage the facets of nut 93. As nut 93 is drawn into socket 91, ribs 101 take up an increasingly greater amount of the available lateral space, and nut 93 crushes the lower portions of ribs 101. The crushed ribs 101 tightly engage nut 93 and securely retain the nut 93 in socket 91 by friction even if bolt 23 is completely removed from the nut. Retention of a seal nut 93 in the molded resin pressure plate 89 is convenient when a seal block assembly is not yet in place because it reduces the number of free parts which must be stored in anticipation of final assembly and installation of the seal. The possible loss of a seal nut is effectively eliminated.

In an alternative manufacturing procedure, the nut 93 may be welded into the plastic material of the molded resin pressure plate 89 using a known ultrasonic welding technique. This technique adds an additional manufacturing step, but the benefits of utilizing the technique merit the effort involved. Use of this technique provides a nut 93 which will remain within the pressure plate 89 without requiring the crushed ribs 101. Moreover, careful welding of the nut 93 provides good alignment for engagement with the bolt distal end 27.

Figure 13:
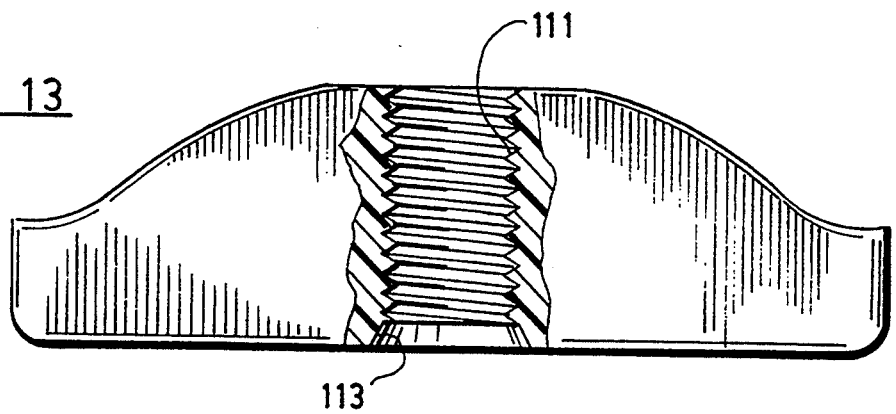
FIG. 13 is a detail sectional cutaway view of another embodiment of the second pressure plate.

FIGS. 13–15 illustrate still another preferred embodiment of a molded resin pressure plate 109 constituting a second pressure plate for use in the invention. Pressure plate 109 includes a threaded bore 111 extending through a central portion of the pressure plate. Threaded bore 111 replaces the central aperture 77 of pressure plate 69 (FIG. 9). The threaded bore 111 includes a beveled rim 113 at one end in the plate surface facing the seal blocks, to aid in insertion of bolt 23.

The threads in bore 111 perform the same function as the hexagonal nut 73 (FIG. 9), thus eliminating the need of a nut altogether. It has been found that use of a molded resin pressure plate 109 having a threaded bore 111 provides good thread engagement to the bolt 23 and leads to several advantages. Among these is the elimination of one detachable part (the nut) and the use of a completely non-metallic part, thus decreasing the corrosion potential of the overall seal assembly. Use of pressure plate 109 lowers costs by eliminating a hex nut for each pressure plate and by permitting faster and easier assembly of the seal.

The elastomer compositions used for elastomer seal blocks 21 may be the same as have been employed for various applications in the past. A frequently used elastomer is EPDM (ethylene-propylene diene monomer) having a specific gravity of 1.09, a tensile strength of 1500 psi, an elongation of 570% and a hardness of 50, durometer A. Other elastomers may also be used, including silicone elastomers, depending on the application and user's needs. Pressure plates 59, 69, 89 and 109 are preferably molded of fiberfilled thermoplastic polyamide; a 6—6 nylon 30% filled with glass fibers is preferred.

The pressure hardware of the invention is lighter in weight and less expensive than the previously known pressure hardware for comparable seals. The weight reduction makes installation easier on large seals, as for conduits of eighteen inches (46 cm) diameter and larger. The exposed metal is materially reduced, and only small metal portions are accessible, minimizing corrosion difficulties, yet the seal structures are stronger than before.

FIGS. 16–19 illustrate additional features of the invention which further reduce corrosion at heads 25 of bolts 23 and at the threaded portions 27 of the bolts that receive nuts 73. FIGS. 16 and 17 show a bolt thread cap 123 having an inner chamber or socket 125; socket 125 receives the threaded end 27 of any of the bolts 23 used with each embodiment described above. Socket 125 is closed off at its outer end by a wall 127. When a seal assembly is installed and bolt 23 tightened, the threaded end 27 of each bolt extends a substantial distance, frequently more than an inch, beyond washer 75; see FIG. 16. The threaded rod tip or distal end 27 of bolt 23 is shown in FIG. 9 as extending only for a very short distance beyond the flange 75 on nut 73 because the bolt has not yet been tightened. But as bolt 23 is screwed into nut 73, the threaded distal end 27 of the bolt extends well beyond pressure plate 69, as shown in FIG. 16. The inner surface of socket 125 complements the shape of the threaded distal bolt end 27, but a tight fit is not necessary or even particularly desirable. In this regard, it should be noted that the second pressure plate and the nut are often inaccessible once a seal assembly is in place between a conduit and a wall opening.

The corrosion prevention cap 123 includes a base flange 129 which extends outwardly of the cap at its base. Beyond flange 129 there is a further portion of cap 123 that includes one or more arcuate ribs 131; a single annular rib can be used. The rib or ribs 131 have an outer diameter that is just slightly larger than the internal diameter of the recess 72 in which the flange 75 of nut 73 is seated. Consequently, when cap 123 is inserted into recess 72, ribs 131 are force fit into the recess so that they form an interference fit therewith. Flange 129 now affords an external cover for recess 72, engaging the outer surface of pressure plate 69. The engagement between flange 129 and pressure plate 69 may or may not afford a complete hydrostatic seal; in any event the cover that cap 123 provides for bolt end 27 and nut 73 inhibits the corrosion that has plagued seal assemblies of the kind described. The same cap construction can be used with the pressure plate of FIG. 13 by providing an appropriate recess into which the cap fits.

A similar type of cap or cover, in this case a bolt head cap 135, is illustrated in FIGS. 18 and 19. The inner surface 137 of cap 135 is shaped and configured to effectively enclose a bolt head 25. Surface 137 may be circular, as shown in FIG. 19 or may be hexagonal if the size of nut 25 is standardized. The outer surface 139 of bolt head cap 135 includes a cylindrical wall 141 which matches or is just shorter than the depth of the socket 61, and also includes an outer rim or flange 143. The cylindrical wall 141 includes one or more protruding ribs 145 which, together with flange 143 create an interference fit in the socket 61 for bolt head 25. The annular flange 143 is at a predetermined height above and projects over the cylindrical wall portion 141.

A bolt head cap 135 is inserted in a socket 61, over a bolt head 25, after a seal assembly is installed and bolts 23 are tightened. Insertion causes the flange 143 to engage tightly in the inner wall of socket 61. The cylindrical wall 141 and ribs 145 of cap 135 thus provide an interference fit with the inner wall of socket 61 and effectively inhibit corrosion of the bolt heads in the environment of use. The outer surface 139 of cap 135 is exposed to the external environment and inhibits entry of moisture and/or corrosive materials into socket 61. A preferred material for both bolt thread cap 123 and bolt head cap 135 is nitrile rubber having a Shore A hardness of about 75.

In yet another preferred embodiment of the second pressure plate, the benefits associated with the embodiments illustrated in FIGS. 14–15 and 16–17 are encompassed in one structure. FIG. 20 illustrates a second pressure plate 169, in cross-section, in which a threaded bore 171 extends through a lower surface that would contact the elastomer seal blocks 21 (FIG. 1). The threaded bore does not extend through the top surface of the pressure plate 169, but it is covered by an integrally formed cap 173 which extends from the pressure plate top surface. Preferably, the cap 173 is integrally connected to the pressure plate 169 around the complete periphery where there is engagement between the two so as to inhibit seepage of moisture into the threaded bore.

Integral cap 173 includes an internal molded thread 175 within the bore 171 which are an extension of the threads of bore 171. The depth of the bore 171 is sufficient to receive a distal end 27 of a threaded bolt 23 completely when the bolt 23 is tightened during use of the seal block assembly. The construction shown in FIG. 20 thus provides the benefit of eliminating the steel hex nut, but also includes the cap shown in FIG. 16 to inhibit corrosion of the nut 23. Moreover, additional benefits arise from use of this embodiment because only one piece is used and the likelihood of a separate cap falling off of the nut 23 is eliminated. The integral formation of the pressure plate 169 and cap 173 also eliminates a seepage path for moisture.

In the invention there is no metal-to-metal sliding contact entailed in tightening the pressure hardware; this is quite unlike the high-friction sliding contact between each bolt head 25 and its adjacent metal pressure plate 31 in the prior construction shown in FIGS. 1–3. In the pressure hardware of the invention, bolt head 25 and washer 65 turn together when the bolt is tightened; the only sliding engagement is between washer 65 and the bottom of recess 61 (see FIG. 7), at a much-reduced friction level.

The consequences are substantial. To begin with, it is easier for the installer to tighten the pressure bolts. Moreover, the seal supplier can specify the torque for tightening the pressure bolts to complete the seal reliably. A seal using one or more embodiments of the invention can be completed by successive tightening of its pressure bolts in a specified program of incremental steps; a program of successive tightening of all bolts in a seal in steps of five, ten, fifteen, and twenty foot-pounds, using an appropriate torque wrench, is typical. The capability of specifying a final torque for an acceptable seal (e.g., 20 ft. lbs.) has not been previously available, due at least in part to the metal-to-metal interfaces used in prior pressure hardware.

Other benefits are derived from the pressure hardware of the invention. Corrosion of the steel bolts that shape and anchor the seal is inhibited or even eliminated. Loss of the retainer nuts is effectively avoided. Overall cost of all of the components is minimized without sacrifice of structural integrity.

I claim:

1. In a seal block assembly for forming a modular, annular conduit-to-wall-opening seal of the kind comprising a plurality of elastomer seal blocks joined to each other in an annulus around a conduit, each seal block having at least one pressure bolt aperture therethrough parallel to the conduit axis, the seal blocks being axially compressed and radially expanded to form a seal between the conduit and an external encompassing wall, the improvement in pressure hardware comprising:

a plurality of molded resin pressure plates each having a plural-facet nut socket facing outwardly of the pressure plate;

and a corresponding plurality of plural-facet nuts, one for each nut socket, the size and configuration of each nut matching the nut sockets in the pressure plates;

each nut socket having a plurality of integral ribs protruding into the socket for engagement with the nut;

whereby full insertion of a nut into a nut socket distorts the rib to afford a firm mechanical connection between the pressure plate and the nut, retaining the nut in the socket;

the pressure plate further having a bolt-receiving aperture therethrough, smaller than the nut, aligned with the socket to admit the thread end of a pressure bolt rod into engagement with the nut.

2. Pressure hardware for an elastomer seal block assembly, according to claim 1, and further comprising a resin bolt thread cap for covering the threaded portion of the bolt rod which extends beyond the nut, the bolt thread cap having a base portion that mounts firmly in the socket of the pressure plate.

3. Pressure hardware for an elastomer seal block assembly, according to claim 2, in which the bolt thread cap is of molded elastomer resin.

4. Pressure hardware for an elastomer seal block assembly according to claim 1 in which each pressure plate includes a plurality of lateral depressions in the outer surface to reduce the weight of the pressure plate.

5. In a seal block assembly for forming a modular, annular conduit-to-wall opening seal of the kind comprising a plurality of elastomer seal blocks joined to each other in an annulus around a conduit, each seal block having at least one pressure bolt aperture therethrough parallel to the conduit axis, the seal blocks being axially compressed and radially expanded to form a seal between the conduit and an external encompassing wall, the assembly including a plurality of sets of pressure hardware for compressing and expanding the seal blocks, each set of pressure hardware comprising:

a bolt having a plural-facet head of given size and shape integral with one end of a bolt rod, the bolt rod having a threaded portion extending longitudinally from its other end toward its bolt head end;

a first molded resin pressure plate having a recess for receiving the bolt head, the recess being deep enough so that the bolt head does not project substantially out of the recess;

the first pressure plate further having a first bolt-receiving aperture therethrough, aligned with the recess, the first bolt-receiving aperture being large enough to admit the bolt rod therethrough but small enough so that the bolt head cannot enter;

a second molded resin pressure plate having a stepped socket facing outwardly of the pressure plate;

the socket having an inner plural-facet socket portion of predetermined depth and given maximum transverse dimension and an outer socket portion having a transverse dimension greater than the maximum transverse dimension of the inner socket portion;

a plural-facet nut of predetermined size and shape complementary to the inner socket portion so that the nut seats therein in non-rotatable relation, the nut having an internal aperture threaded to engage the threaded portion of the bolt rod;

the second pressure plate further having a second bolt-receiving aperture therethrough, smaller than the nut, aligned with the socket to admit the other end of the bolt rod into engagement with the nut; and the plural-facet sockets for receiving the nut in the second pressure plate each having an axially extending integral rib protruding into the socket for engagement with a facet of the nut, whereby full insertion of the nut into the socket crushes the rib to afford a firm mechanical connection between the second pressure plate and the nut.

6. Pressure hardware for an elastomer seal block assembly according to claim 5 in which each pressure plate includes a plurality of lateral depressions in the outer surface to reduce the weight of the pressure plate.

7. Pressure hardware for an elastomer seal block assembly, according to claim 5, and further comprising a resin bolt head cap for covering the bolt head, the bolt head cap having a base portion that mounts firmly in the socket of the first pressure plate.

8. Pressure hardware for an elastomer seal block assembly, according to claim 7, in which the bolt head cap is of molded elastomer resin.

9. Pressure hardware for an elastomer seal block assembly, according to claim 5, and further comprising a resin bolt thread cap for covering the threaded portion of the bolt rod which extends beyond the nut, the bolt thread cap having a base portion that mounts firmly in the socket of the second pressure plate.

10. Pressure hardware for an elastomer seal block assembly, according to claim 9, in which the bolt thread cap is of molded elastomer resin.

* * * * *